US011496620B1

(12) United States Patent
Dressler et al.

(10) Patent No.: US 11,496,620 B1
(45) Date of Patent: Nov. 8, 2022

(54) AUTOMATED CONSENT MANAGEMENT SYSTEM AND METHOD FOR MANAGING AUTOREPLY MESSAGES TO INCOMING CALLS

(71) Applicant: Rhinogram Inc., Chattanooga, TN (US)

(72) Inventors: Keith Dressler, Ooltewah, TN (US); Austin Roberts, Ooltewah, TN (US); Stanley Dressler, Chattanooga, TN (US)

(73) Assignee: Rhinogram Inc., Chattanooga, TN (US)

( * ) Notice: Subject to any disclaimer, the term of this patent is extended or adjusted under 35 U.S.C. 154(b) by 0 days.

(21) Appl. No.: 17/828,492

(22) Filed: May 31, 2022

(51) Int. Cl.
*H04M 1/72484* (2021.01)
*H04M 3/42* (2006.01)
(Continued)

(52) U.S. Cl.
CPC ......... *H04M 1/72484* (2021.01); *H04M 1/64* (2013.01); *H04M 1/72436* (2021.01); *H04M 3/42* (2013.01)

(58) Field of Classification Search
CPC ......... H04M 1/72484; H04M 1/72436; H04M 1/64; H04M 3/42
See application file for complete search history.

(56) References Cited

U.S. PATENT DOCUMENTS 7,844,037 B2   11/2010   Champlin et al.
8,503,994 B1 *  8/2013   Sanjeev .................. H04M 1/64
                                                        455/418
(Continued)

FOREIGN PATENT DOCUMENTS

CN    110784393    2/2020
GB    2470359     11/2010

OTHER PUBLICATIONS

Rashmi Ashish Kadam, "Informed consent process: A step further towards making it meaningful!", Jul.-Sep. 2017, Perspectives in Clinical Research; vol. 8(3): pp. 107-112. (Year: 2017).

(Continued)

*Primary Examiner* — Keith Ferguson
(74) *Attorney, Agent, or Firm* — Miller & Martin PLLC

(57) ABSTRACT

The systems and methods disclosed herein provide automated consent management for ensuring compliance with user-consent laws, rules, and/or regulations integrated with the automatic generation and transmission of autoreply messages. In accordance with the disclosed embodiments, a computer system may be configured to communicate with a user over both first and second communication channels, where the system requires the user's consent before it can communicate with the user over the second communication channel. The system may receive an incoming communication, such as a telephone call, from the user over the first communication channel. The computer system may automatically generate an autoreply message, such as a text message, to send to the user over the second communication channel in response to the incoming communication if the computer system automatically determines that the user has provided all necessary user consents for sending the autoreply message over the second channel.

20 Claims, 5 Drawing Sheets

(51) Int. Cl.
  *H04M 1/64* (2006.01)
  *H04M 1/72436* (2021.01)

(56) References Cited

U.S. PATENT DOCUMENTS

| | | | |
|---|---|---|---|
| 8,843,997 B1 | 9/2014 | Hare | |
| 8,897,822 B2 | 11/2014 | Martin | |
| 9,374,693 B1 | 6/2016 | Olincy et al. | |
| 10,417,725 B2 | 9/2019 | Whitfield et al. | |
| 10,454,853 B2 | 10/2019 | Park et al. | |
| 10,505,737 B1 | 12/2019 | Xu et al. | |
| 10,586,535 B2 | 3/2020 | Kudurshian et al. | |
| 10,601,743 B1 | 3/2020 | Caldwell et al. | |
| 10,623,567 B1 | 4/2020 | Perdue et al. | |
| 10,754,932 B2 | 8/2020 | Wiederspohn et al. | |
| 10,791,067 B1 | 9/2020 | G et al. | |
| 10,841,248 B1 | 11/2020 | Hajdu et al. | |
| 10,965,817 B1* | 3/2021 | Stokes | H04M 7/0051 |
| 2005/0060417 A1* | 3/2005 | Rose | H04L 67/30 |
| | | | 709/228 |
| 2008/0263158 A1 | 10/2008 | del Cacho et al. | |
| 2011/0320960 A1 | 12/2011 | Cai et al. | |
| 2012/0064924 A1 | 3/2012 | Schapsis et al. | |
| 2013/0097269 A1* | 4/2013 | Plotkin | H04M 1/72484 |
| | | | 709/206 |
| 2013/0124262 A1* | 5/2013 | Anchala | G06Q 30/02 |
| | | | 705/7.32 |
| 2015/0050637 A1 | 2/2015 | James-Hatter et al. | |
| 2015/0234796 A1* | 8/2015 | Williams | G06F 40/143 |
| | | | 715/229 |
| 2017/0222956 A1 | 8/2017 | Jain et al. | |
| 2018/0103004 A1* | 4/2018 | Demir | H04L 51/52 |
| 2019/0005210 A1 | 1/2019 | Wiederspohn et al. | |
| 2019/0372770 A1 | 12/2019 | Xu et al. | |
| 2019/0392171 A1 | 12/2019 | Barday et al. | |
| 2020/0175554 A1 | 6/2020 | Vukich et al. | |

OTHER PUBLICATIONS

University of California San Francisco, "Obtaining and Documenting Informed Consent", Oct. 10, 2018, Published on UCSF Institutional Review Board (http://irb.ucsf.edu), retrieved from https://web.archive.org/web/20190429095449/https//irb.ucsf.edu/obtaining-and-documenting-informed-consent, Jul. 2018). (Year: 2018).

Ml. Zawadzinski and M. Wlosik, "What Is a Consent Management Platform (CMP) and How Does it Work?", dated Nov. 10, 2020, available at https://clearcode.cc/blog/consent-management-platform.

* cited by examiner

AUTOMATED CONSENT MANAGEMENT SYSTEM AND METHOD FOR MANAGING AUTOREPLY MESSAGES TO INCOMING CALLS

FIELD OF THE INVENTION

The present invention generally relates to consent management, and more particularly, to systems and methods for managing the transmission of autoreply messages in response to incoming calls in compliance with applicable laws, rules, and/or regulations requiring consents before such autoreplies may be transmitted.

BACKGROUND OF THE INVENTION

In 1991, Congress passed the Telephone Consumer Protection Act (TCPA) to restrict unsolicited telemarketing phone calls to consumers. The TCPA protects consumers from receiving unwanted "robocalls" by placing restrictions on when and how such automated calls may be made and allowing consumers to opt out from receiving such calls. In accordance with the TCPA, the Federal Trade Commission (FTC) established a national "do not call" registry to protect consumers who do not wish to be contacted. Short Message Service (SMS) text messages sent to a consumer's cellular phone are considered "calls" for purposes of the TCPA. As described herein, however, a telephone call comprises voice information and possibly additional information and/or metadata and therefore also may be referred to as a voice call, whereas a text message is a text-based message that does not include voice information.

According to the TCPA, and related Federal Communications Commission (FCC) rules, a consumer must provide its prior express consent before a telemarketer or other entity can make unsolicited calls or text messages to the consumer in a manner that would otherwise violate the TCPA's restrictions. For some communications, such as containing unsolicited advertisements, the consumer's prior express consent must be in writing. The TCPA's regulations generally mean that, as a practical matter, organizations sending marketing and advertising materials must receive express written consent from individuals prior to sending any text messages to them.

In some cases, an individual's consent under the TCPA can be implied based on the individual's actions, even in the absence of receiving an express consent. For example, a customer's consent to receive telephone calls from a business may be implied if the customer provides a telephone number to the business without any limiting instructions regarding whether or when the business may contact that customer using the provided number. The customer's consent to receive telephone calls from the business also may be implied if the customer first calls the business and leaves a message requesting a response. Similarly, the customer's consent to receive text messages may be implied under the TCPA if the customer first initiates a conversation with the business using a text message, such as by sending a request or another text message requiring a response.

In general, however, a customer's consent for a business to contact the customer using text messages is not implied solely based on that customer first making a telephone call to the business. Rather, in order for the customer to receive text messages in response to a telephone call, the customer must have either previously provided their express consent to receive text messages from the business or otherwise have established their implied consent. As used herein, a "business" broadly refers to any company, enterprise, organization, association, agency, partnership, joint venture, or other entity of any type, size, or structure, whether private or public, and whether for-profit or non-profit, that may communicate with one or more individuals.

For example, when a health care provider wants to send text messages to a patient, the health care provider first must obtain the patient's consent as required by the TCPA. The health care provider also must give the patient an option to subsequently opt-out of text-message communications and, if they choose to opt out, the provider cannot send them any more text messages. As a result, health care providers that lack the required TCPA consents from patients cannot respond to incoming telephone calls from patients using text-message responses. For this reason, an employee of the health care practice is typically tasked with manually responding to each incoming telephone call by calling back each patient separately, which can be extremely time consuming and may take the employee away from other needed tasks in the health care practice. This same problem exists for other types of businesses that must comply with the TCPA (or similar) consent requirements.

In 1996, President Clinton signed the Health Insurance Portability and Accountability Act (HIPAA) into law. HIPAA protects the security and privacy of a patient's health information when it is in the possession of a third party, such as a doctor or other health care provider. For example, HIPAA requires a patient's written authorization before his or her protected health information (PHI) may be used or disclosed for marketing purposes. HIPAA security and privacy protections also cover electronic protected health information (ePHI) that is created, stored, transmitted, or received in any electronic format, including for example, via text messages.

In addition to receiving the patient's TCPA consent to receive text messages, the health care provider also needs to obtain a separate prior written consent from the patient, as required by HIPAA, to begin exchanging ePHI with the patient using text messages. In some cases, additional patient consents also may be required to comply with the European Union's General Data Protection Regulation (GDPR) data protection requirements and/or U.S. data privacy laws. In short, a health care provider desiring to communicate with its patients using text messages may need to acquire and manage a large number of user consents, for example, including several different types of consents (e.g., TCPA, HIPAA, etc.) for many patients.

Further, different types of communication channels may be subject to different user-consent requirements. As used herein, a "communication channel" refers to a physical or logical connection for communicating information between two or more entities. A communication channel may convey analog and/or digital information. In some cases, a communication channel may be implemented as an end-to-end communication session established over a public or private network using one or more network protocols. A single communication channel can comprise one or more different types of communication channels that collectively provide end-to-end communications between communicating entities. Types of communication channels may include, but are not limited to, end-to-end connections for telephone calls, text messages, e-mail messages, instant messages, and data or voice communications over any wireless or wireline protocols. Accordingly, telephone calls and text messages may correspond to different types of communication channels subject to different user-consent requirements.

In view of the foregoing, user consent management at health care providers and at other types of businesses can be a very complicated and burdensome process, typically managed manually through data entry. For example, each user consent is conventionally entered manually as a binary value (e.g., "yes" or "no" consent). Frequent changes and updates to the various user consents, however, can quickly become an unwieldy process that is prone to error. The opportunities for data-entry error increase with the number of users. As used herein, a "user" is any person or group of people that must provide its consent to another entity before that other entity may create, send, receive, and/or store information of the user in compliance with one or more statutes, rules, policies, and/or regulations (regardless how defined or by whom). The user consent may be required based on governmental laws, rules, or regulations, but need not be. For example, one or more user consents may be required to comply with a company's policies or with certain contractual terms or conditions. As used herein, a "user consent" is an indication of a user's permission or authorization to allow another entity to perform an associated action.

Failures to obtain the required user consents can result in severe financial penalties. For example, TCPA violations are enforced by the FCC, which may levy up to more than $18,000 per violation. Consent and opt-out management violations are common reasons for TCPA fines. It is therefore important for health care providers, as well as other types of businesses, to comply with the user-consent requirements of the TCPA and other laws, rules, and regulations requiring user consents for certain types of communications.

There is a current need for a more efficient way for an organization, such as a health care provider, corporation, governmental agency, or other entity, to manage communications with remote users over different types of communication channels, such as using telephone calls and text messages, in compliance with the TCPA and other laws, rules, and regulations requiring user consents before communicating over one or more of the communication channels.

SUMMARY OF THE INVENTION

The present invention overcomes the disadvantages of the prior art by providing systems and methods for managing user consents in connection with sending autoreply messages to users. As used herein, an "autoreply message" or "autoreply" refers to a message that is automatically generated by a computer system in response to a received communication from a user. The autoreply message may be transmitted as a text message, e-mail message, instant message, or the like. In some cases, the computer system cannot send the autoreply message to the user if the system has not received one or more user consents. For example, if the autoreply is a text message, the user may need to have provided a TCPA consent; if the autoreply contains ePHI, the computer system may need to confirm that the user has provided a HIPAA consent. Unlike existing systems and methods, the disclosed embodiments are configured to integrate automated user-consent compliance for TCPA, HIPAA, GDPR, and/or other laws, rules, and regulations with the automatic generation and transmission of autoreply messages.

In accordance with the disclosed embodiments, a computer system may be configured to communicate with a user over both first and second communication channels, where the system requires the user's consent before it can communicate with the user over the second communication channel. The system may receive an incoming communication, such as a telephone call, from the user over the first communication channel. In the disclosed embodiments, a consent management system determines whether the user has provided all necessary user consents for the computer system to send an autoreply message, such as a text message, to the user over the second communication channel. The computer system may automatically generate the autoreply message and transmit it to the user over the second communication channel if the consent management system has determined the user has provided all necessary user consents for sending the autoreply message over the second channel.

In some embodiments, the consent management system may be configured to not only determine whether all necessary user consents have been received from the user before the autoreply message may be sent to the user over the second communication channel, but also may be configured to generate and/or transmit the autoreply message itself. In other embodiments, the consent management system may be coupled to separate hardware and/or software in a computer system that is configured to automatically generate and send the autoreply. In some embodiments, the autoreply message may be a predefined message, either for all users or predefined for one or more specific users. In some embodiments, the contents and/or metadata (including addressing) of the autoreply message may be automatically determined based on at least a portion of a communication received from the user over the first communication channel.

For example, a computer system at a health care provider may comprise a communication interface (such as a cellular-network interface) and a phone application configured to receive an incoming telephone call from a patient. The phone application may identify certain caller identification ("Caller ID") information received with the incoming call to identify the patient, for example, based on a name or phone number included in the Caller ID information. In this example, the computer system may also comprise (or may be coupled to) a consent management system that receives from the phone application certain information corresponding to the patient's identity, which may or may not be the same as the Caller ID information, to determine if the patient has previously provided consent to receive text messages from the health care provider. The consent management system also may determine if any other consents, such as a HIPAA consent, has been received for the patient. If the patient has provided the required consent(s), the consent management system, the phone application, and/or a separate messaging application may automatically generate and send an autoreply text message to the patient. The telephone number for the autoreply text message may be determined from the Caller ID information and/or other stored contact information associated with the patient.

In some embodiments, the autoreply message may acknowledge receipt of the user's telephone call. In other embodiments, the autoreply message may be customized or personalized for the specific user. In yet other embodiments, a messaging application or another application on the computer system may process a transcribed (e.g., voice-to-text) version of a voice message from the user and then dynamically prepare the autoreply message based on the contents of the transcribed message. For example, if the user's voice message includes the word "appointment" or the phrase "schedule an appointment," an autoreply text message could be automatically generated indicating that "Someone will contact you soon about your appointment inquiry." In some embodiments, one or more machine learning and/or natural language processing engines may be used to extract and/or identify words, phrases, and contents from a user's voice message in order to generate an appropriate autoreply message to send to the user.

The disclosed embodiments are not limited to any particular types of organizations, consents, or users. That is, the consent management systems and methods of the present invention advantageously may be used by any entities, whether health care providers, enterprises, governmental agencies, non-profits, or any other businesses that manage consents for one or more users. Other aspects, advantages, and features of the invention will become apparent to those skilled in the art based on the various exemplary embodiments disclosed in the following detailed description and associated drawings.

BRIEF DESCRIPTION OF THE DRAWINGS

The particular features and advantages of the invention will become apparent from the following description taken in connection with the accompanying drawings in which like reference numbers indicate identical or functionally similar elements. The following figures depict details of disclosed embodiments. The invention is not limited to the precise arrangement shown in these figures, as the accompanying drawings are provided merely as examples.

DETAILED DESCRIPTION OF DISCLOSED EMBODIMENTS

Figure 1:
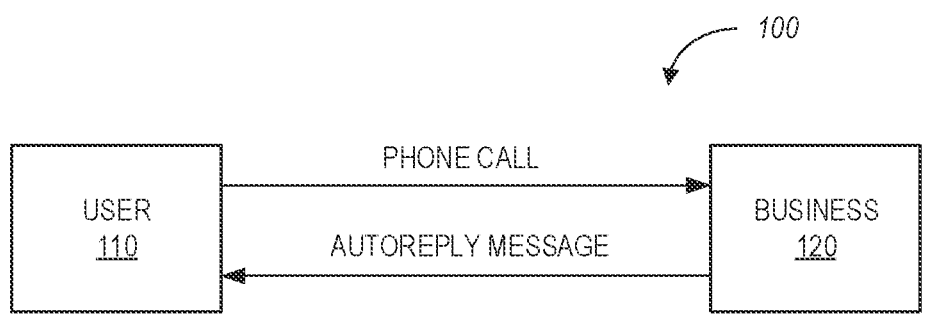
FIG. 1 is a schematic block diagram of an exemplary configuration in which a user may communicate with a business in accordance with certain disclosed embodiments.

FIG. 1 shows an exemplary network configuration 100 in which a user 110 and a business 120 may communicate in accordance with certain disclosed embodiments of the invention. In this exemplary embodiment, the user 100 may communicate with the business 120 by placing a telephone call to a telephone number associated with the business. The telephone call may be established using a Public Switched Telephone Network (PSTN) or over any other wired and/or wireless telecommunication networks, such as supporting GSM, LTE, and/or other telecommunication protocols and standards. In some embodiments, the incoming call may be a telephone call sent over a public or private network using standard networking protocols, such as a Voice over Internet Protocol (VoIP) call received over a packet-based or circuit-based network.

In the exemplary embodiment of FIG. 1, the incoming telephone call comprises a voice-based communication from the user 110 that is received by the business 120 over any communication channel connecting the user and business. The incoming telephone call may include real-time and/or prerecorded voice data from the user 110. The telephone call received at the business 120 may comprise analog or digital signals or combinations thereof.

In FIG. 1, the user's incoming telephone call may be received by, or may be routed to, one or more computer systems that are owned, operated, and/or controlled by the business 120. The business may comprise, but is not limited to, a health care provider, corporation, governmental agency, or any other entity that communicates with users and manages user consents. In some embodiments, the one or more computer systems that receive and process the received telephone call at the business 120 may be dedicated to receiving user calls, checking user consents, and/or generating autoreplies. In other embodiments, the one or more computer systems at the business 120 may be further configured to provide functionality in addition to call processing, consent management, and autoreply generation.

In the exemplary embodiment of FIG. 1, the business 120 may receive the incoming telephone call from the user 110 and automatically generate an autoreply message that it returns to the user in response to the incoming call. Unlike prior systems and methods, the business 120 integrates an automated consent management system with generation and transmission of autoreply messages, and may be configured to automatically check for one or more user consents before transmitting the autoreply message to the user 110 in response to the incoming call in FIG. 1. For example, the incoming call may be received by the business 120 over a first communication channel, such as a telephone call over a cellular network, whereas the autoreply message may be formatted as a text message or another type of message that requires the user's consent before it can be transmitted over a second communication channel, such as through a SMS system, Multimedia Message Service (MMS) system, or other messaging system.

Advantageously, the one or more computer systems in the business 120 may comprise a consent management system that is configured to interoperate with a phone application, a messaging application, and/or other applications to automate the steps of processing of an incoming user call, confirming receipt of all necessary user consents before sending an autoreply message to the user, and generating and transmitting the autoreply message after confirming that all user consents needed to send the autoreply have been received.

In accordance with certain exemplary embodiments, the one or more computer systems in the business 120 may comprise a consent management server, such as disclosed in U.S. application Ser. No. 17/133,454, entitled "Automated Consent Management Systems and Methods for Using Same," filed Dec. 23, 2020, by K. Dressler et al., which patent application is hereby incorporated by reference in its entirety as if fully set forth herein.

Figure 2:
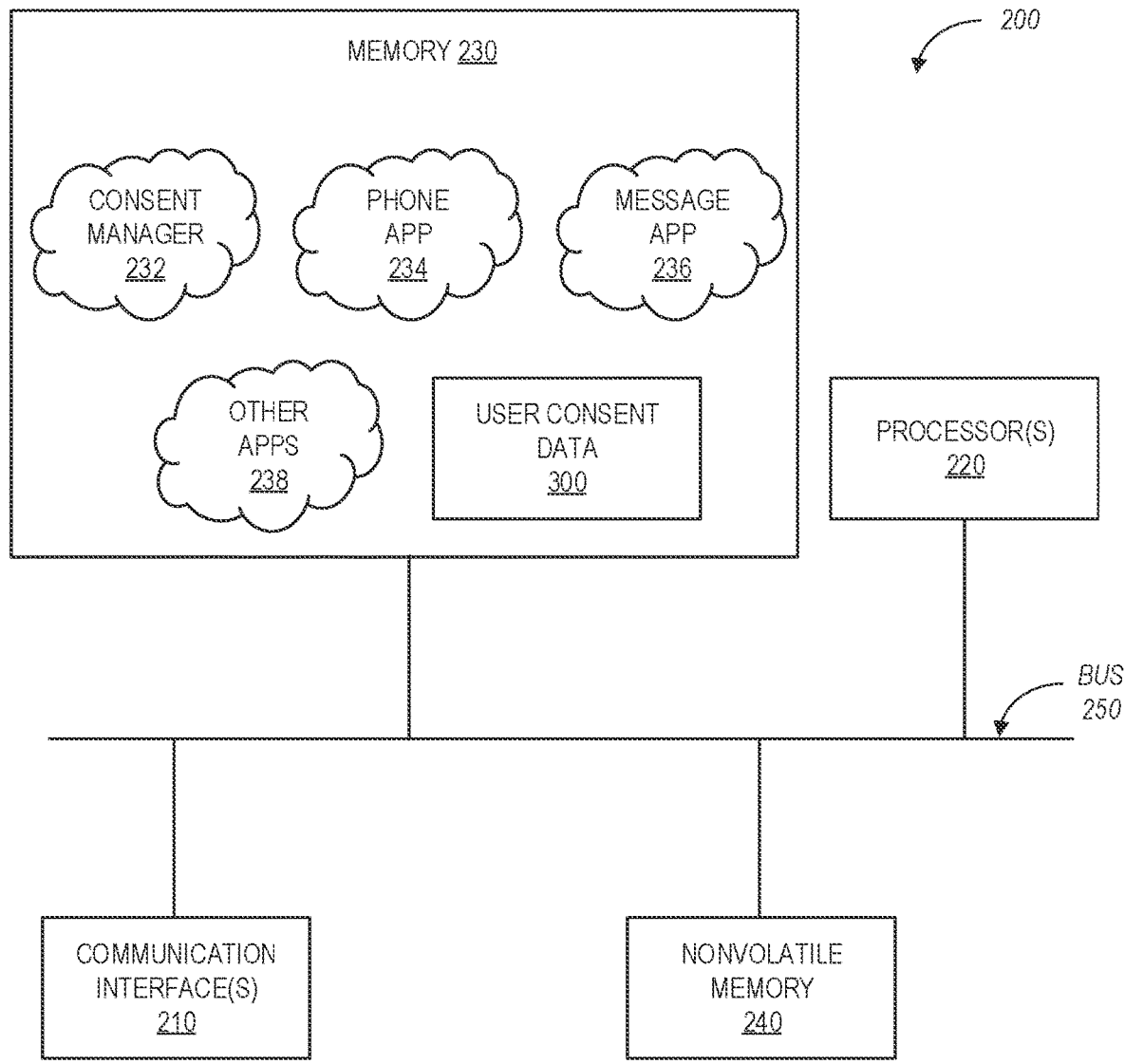
FIG. 2 is a schematic block diagram of the exemplary server comprising at least a consent manager, a phone application, and a messaging application that may be used in accordance with certain disclosed embodiments.

FIG. 2 is a schematic block diagram of an exemplary computer system 200 that may be implemented at the business 120 and used in accordance with the embodiments described herein. The exemplary computer system 200 may comprise one or more communication interfaces 210 (e.g., wired, wireless, etc.), one or more processors 220, a memory 230, and a nonvolatile memory 240, interconnected by a system bus 250. The computer system 200 also may contain other components, such as a power supply, memory controller(s), display/monitor, keyboard, mouse, printer, and so forth, which are not shown in FIG. 2 for purposes of clarity. Further, those skilled in the art will appreciate that the hardware and software components of the exemplary computer system 200 described below may be deployed in a single computer or alternatively may be distributed among multiple interconnected computers, such as one or more computers interconnected over a local area network or an enterprise network used by the business.

The communication interface(s) 210 include the mechanical, electrical, and signaling circuitry for communicating data, such as but not limited to incoming telephone calls and outgoing autoreply messages as shown in the network configuration 100 of FIG. 1. The interfaces 210 may be configured to transmit and/or receive data using a variety of different communication protocols and data formats, and may include any wireless or wired/physical connections or media configured to communicate over different types of networks. For example, the communication interfaces 210 may include at least one wireless interface for communicating over cellular, WiFi, Bluetooth, and/or other wireless networks. In some embodiments, the interfaces 210 may include interfaces for connecting to telephone, Ethernet, and/or coaxial cables. The communication interfaces may include specialized processors, memories, logic, circuitry, software, and firmware (not shown) for processing and formatting communications through the interfaces 210.

The one or more physical processors 220 (also interchangeably referred to herein as processor(s) 220, processor 220, or processors 220 for convenience) may be configured to provide information processing capabilities in the exemplary computer system 200. The processor(s) 220 may comprise one or more of a microprocessor, microcontroller, central processing unit, application specific integrated circuit, field programmable gate array, or any other circuit, state machine, and/or other mechanism configured to electrically process information in accordance with the disclosed embodiments herein.

The memory 230 comprises a plurality of storage locations that are addressable by the processor(s) 220 and/or the communication interfaces 210 for storing software programs and data structures associated with the embodiments described herein. The processor(s) 220 may comprise hardware elements or hardware logic adapted to execute the software programs and manipulate the data structures in the memory 230. Software programs and data may be loaded into the memory 230 from the nonvolatile storage 240, which may be a hard drive, solid state drive, battery-backed random access memory, or any other form of persistent memory as known in the art. Similarly, software and/or data that has been modified in the memory 230 may be committed to longer term storage in the nonvolatile memory 240. Each of the memory 230 and nonvolatile memory 240 may comprise one or more interconnected memories.

The processor(s) 220 may be configured to execute one or more computer readable instructions stored in the memory 230 to provide functionality of at least a consent manager 232, a phone application 234 ("phone app"), a message application 236 ("message app"), and one or more other applications ("other apps") 238 in accordance with the disclosed embodiments. The consent manager 232 may be used to automate user-consent management as discussed further herein. The phone app 234 may be configured to process incoming telephone calls received by the communication interfaces 210. The phone app 234 also may be configured to interact with the consent manager 232, for example, to identify Caller ID information and provide at least some of the identified Caller ID information to the consent manager 232, which in turn may use the Caller ID information to ensure that the computer system 200 will not send autoreply messages to a calling user unless that user has provided all necessary consents.

The message app 236 may be configured to generate autoreply messages in the computer system 200. The message app may be further configured to interact with the consent manager 232, for example, to ensure that an autoreply message is not sent to a user unless the consent manager 232 had provided an indication to the message app 236 that the user has provided all necessary consents to receive the autoreply message. In some embodiments, the consent manager 232 determines which user consent(s) are needed before an autoreply message may be sent to a user from the computer system 200. The consent manager 232 may identify the necessary consents based on the type of autoreply message to be sent (e.g., an SMS or MMS message) and/or based on the contents of the planned autoreply message. In some embodiments, the message app 236 provides at least a portion of the contents of the autoreply message to the consent manager to enable the consent manager to identify which user consents to check in connection with the autoreply message. In other embodiments, the message app 236 or another app 238 provides information to the consent manager 232 that enables the consent manager to identify which user consent(s) to check in connection with the autoreply message.

In some embodiments, the consent manager 232, phone app 234, message app 236, and other apps 238 may be implemented as separate applications. In alternative embodiments, one or more of the consent manager 232, phone app 234, message app 236, and other apps 238 may be combined or otherwise integrated into a single, monolithic software program. Further, in embodiments where the computer system 200 is deployed in cloud-based network architectures, the consent manager 232 may be implemented as one or more cloud-based services in which at least a portion of the consent-manager functionality described herein may be accessible over a network, such as the internet, using a cloud-based service.

In addition, the memory 230 also may contain other computer readable instructions (not shown in FIG. 2) that when executed by the processor(s) 220 provide, for example, an operating system, network protocol stack, and other software processes, services, and applications. The memory 230 also may store various data, such as the user-consent data 300, that may be accessed and/or updated by the consent manager 232. The user-consent data 300 may be loaded into the memory 230 from a copy of the user-consent data stored in the nonvolatile memory 240. In operation, modifications to the user-consent data 300 in the memory 230 may be committed to more persistent storage in the nonvolatile memory 240 by the processor(s) 220.

Figure 3:
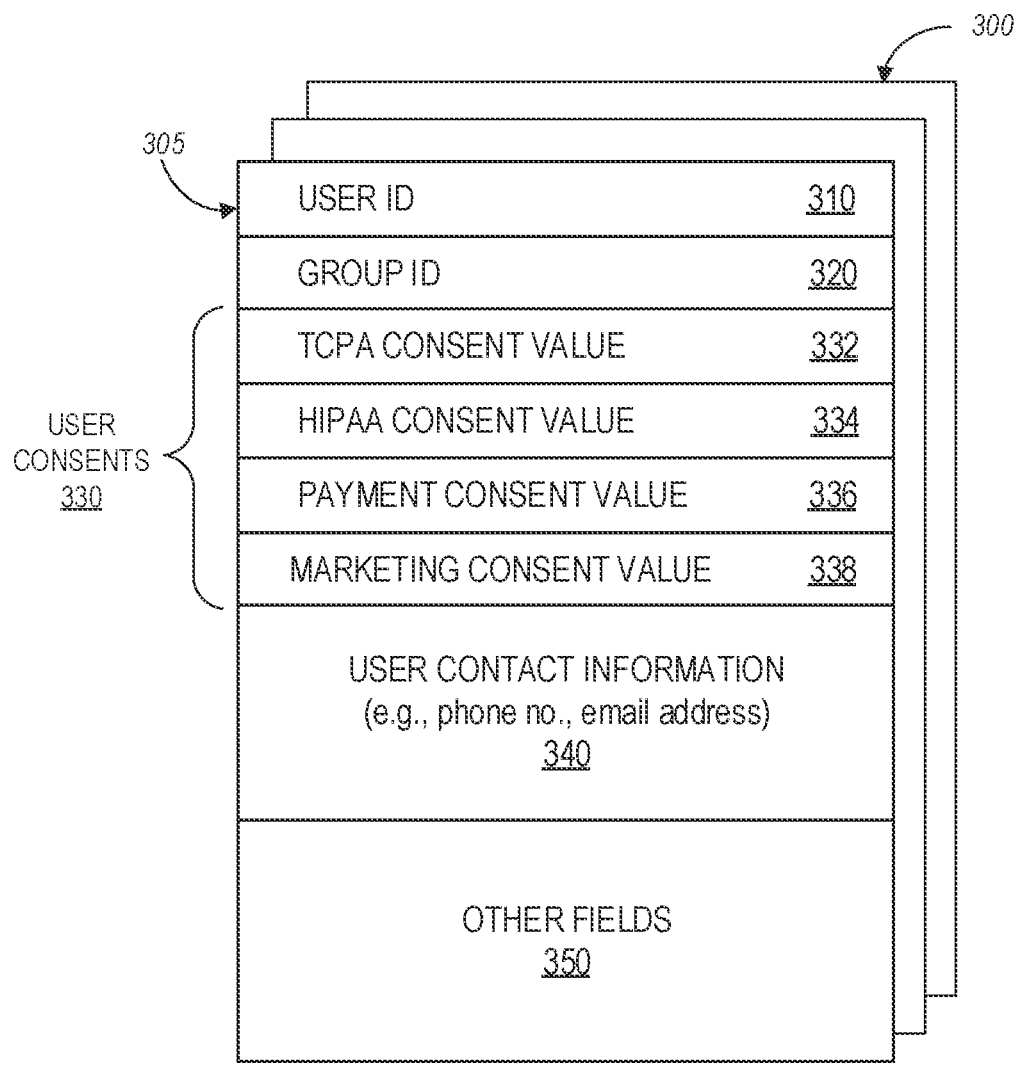
FIG. 3 is a schematic block diagram of user-consent data for one or more individual users that may be stored in the exemplary server of FIG. 2 in accordance with certain disclosed embodiments.

FIG. 3 is a schematic block diagram of the user-consent data 300 that may be used by the consent manager 232 in accordance with certain disclosed embodiments. The user-consent data 300 preferably comprises separate files or records 305 (hereinafter user records 305) that store each user's consent information for the consent management system. The user-consent data 300 may be stored, for example, as part of a database within the memory 230 and/or nonvolatile memory 240. In the exemplary embodiment of FIG. 3, each user record 305 comprises fields configured to store, for example, a User ID 310, Group ID 320, user consents 330, user-contact information 340, and other fields 350. Those skilled in the art will understand that the ordering and arrangement of the exemplary fields in FIG. 3 are illustrative and other data formats may be used consistent with the disclosed embodiments.

The User ID 310 is a unique identifier value associated with a particular user 110. The consent manager 240 and/or campaign manager 250 preferably use the User ID value to index an associated user's data record 305. The Group ID 320 is preferably an optional field that stores a value used to associate one or more users 110 belonging to a common group. In certain embodiments, for example, the Group ID may be used to associate a group of connected parties, such as individuals in the same family, employees of the same company, members of the same organization, etc. In such embodiments, the connected parties may be identified by filtering user-consent data records 305 based on Group ID values.

The user consents 330 comprise one or more user-consent values 332-338 corresponding to different types of user consents. For example, in the example of FIG. 3, the user record 305 includes a TCPA consent value 332, a HIPAA consent value 334, a payment consent value 336, and a marketing consent value 338. In this example, the TCPA consent value 332 may indicate whether the user has consented to text-message communications; HIPAA consent value 334 may indicate whether the user has consented to communications containing the user's ePHI; payment consent value 336 may indicate whether the user has consented to receiving electronic billing and/or payment; marketing consent value 338 may indicate whether the user has consented to receiving communications with marketing or targeting advertising content.

The specific user consent values 332-338 associated with each user may, in some embodiments, vary from user to user and/or depend on the particular consent-management implementation. For example, an organization that does not maintain ePHI for individual users may not need to obtain HIPAA consent values. Other organizations may only need to track GDPR consent values for its users. Thus, the specific consent values 330 illustrated in FIG. 3 are merely representative and not limiting. The user data records 305 also may contain other types of user consent values in addition to the exemplary user consent values shown in FIG. 3.

In accordance with some disclosed embodiments, each user consent value may be associated with one of at least two possible values comprising: a first value indicating that the user has granted consent or a second value indicating that the user has denied consent. In some embodiments, the second value also may indicate that the user has revoked a previously-granted consent. Furthermore, in some embodiments, one or more of the exemplary user consent values 332-338 also may be associated with a third value indicating that the user has not yet responded with a grant or denial of consent. The consent manager 232, for example, may initially assign any, or all, of user-consent values 332-338 equal to the third value as a default value. Then, after the user indicates a grant or denial of a particular user consent, the consent manager 232 may update the corresponding user-consent value 332-338 in the user's record 305 to either the first or second value, depending on whether the user granted or denied consent.

In some embodiments, the consent manager 232 may be configured to filter those user consents 332-338 in a user's record 305 that are assigned to the third value and automatically send, or cause another application or process to send, a message to the user requesting the user's consent(s). The consent manager, for example, may be configured to send a user a single message requesting one or more user consents for purposes of updating consent values in the user's record 305. In some embodiments, the consent manager 232 may be configured to sequentially scan each user record 305 to identify users having the third value assigned to a particular type of consent, such as TCPA consent value 332, and then send a separate user-consent request to each such identified user. In the disclosed embodiments, the consent manager 232 may scan and filter user-consent values 332-338 in the user records 305 periodically, at predetermined times, or asynchronously, such as at the start of a new campaign or upon occurrence of one or more predetermined events during a campaign.

The user record 305 also may store various user-contact information 340 associated with the record's associated user 110. Such user-contact information 340 may include, for example, the user's phone number (e.g., for telephone or text-message communications), email address(es), physical mailing address(es), and/or other contact information. The record 305 also may contain one or more other fields 350, for example, storing various data including but not limited to, for example, the user record's date of creation, date of last update, identification and date of last sent user-consent request, etc.

Figure 4:
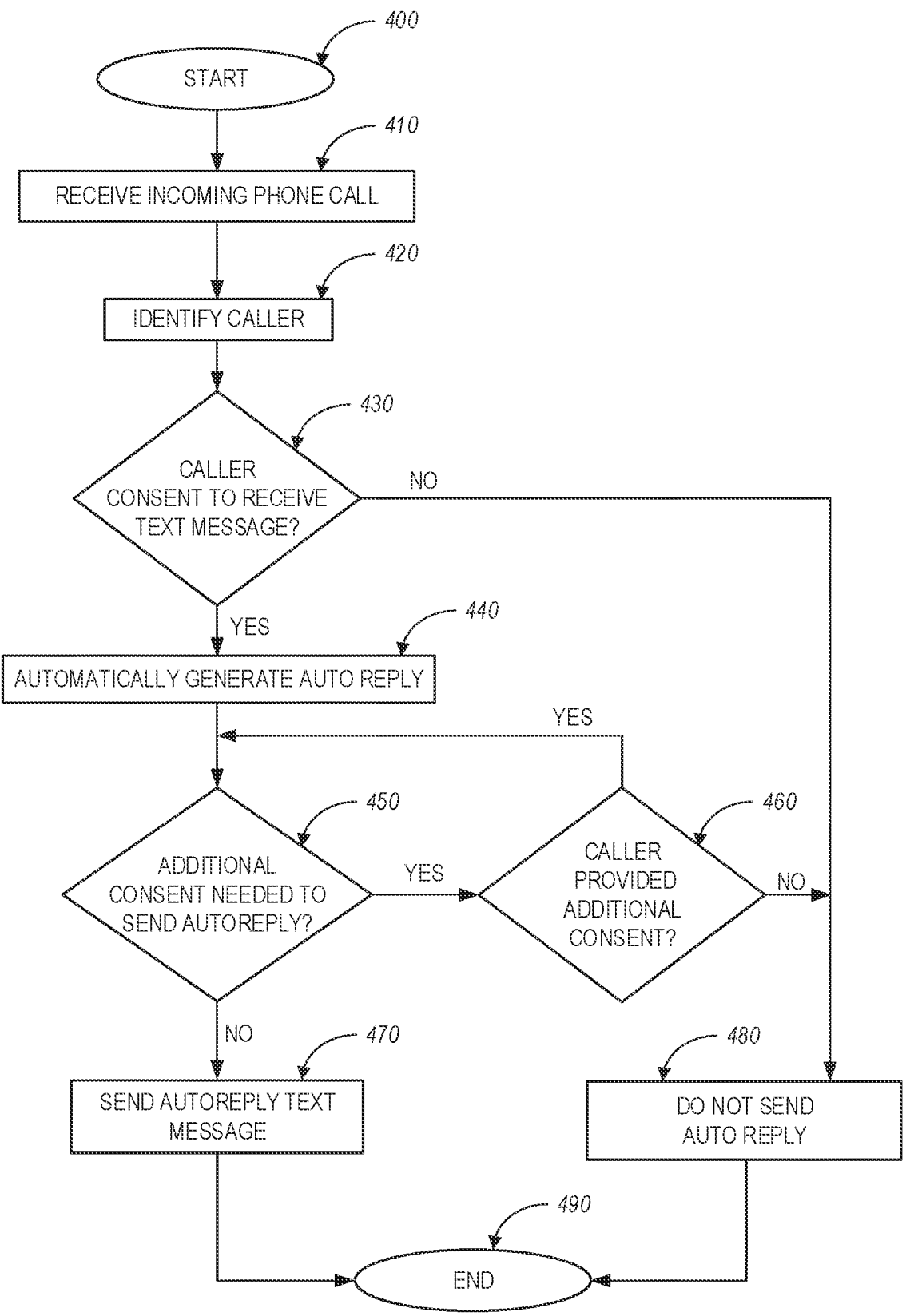
FIG. 4 is a schematic diagram illustrating an exemplary sequence of steps that may be performed by the server of FIG. 2 in accordance with certain disclosed embodiments.

FIG. 4 is a flowchart illustrating an exemplary sequence of steps that may be performed at the computer system 200 to automatically generate an autoreply message in response to a received telephone call from a remote user 110 in accordance with certain disclosed embodiments. The sequence starts at step 400 and proceeds to step 410 where the computer system receives an incoming telephone call from the user. For example, the computer system 200 may comprise a cellular network interface 210 configured to receive the incoming call, and the call may be processed by a phone app 234 executing on one or more processors 220 of the computer system 200. In some embodiments, the computer system 200 may be implemented as one or more servers at a health care provider, such as a doctor's office, and the calling user may be a patient. Those skilled in the art will appreciate the computer system 200 used in accordance with the exemplary steps of FIG. 4 may comprise one or more computers at any business or other entity configured to communicate with remote users, such as at the exemplary business 120 configured to communicate with the remote user 110 in the network configuration of FIG. 1.

Next, at step 420, the computer system 200 may be configured to identify Caller ID information associated with the incoming call. The Caller ID information may include, for example, a phone number and/or a name or other personal identifier of the calling user. In some embodiments, the phone app 234 is configured to identify such Caller ID information and provide the Caller ID information to the consent manager 232 on the computer system 200. The consent manager 232 may be configured to use at least a portion of the Caller ID information to access a user record 305 associated with the calling user. The accessed user record 305 may be stored with user-consent data 300 in a memory 230, a nonvolatile memory 240, or in one or more remote databases (not shown in FIG. 2) that may be accessible to the computer system 200 through the communication interfaces 210.

In some embodiments, the consent manager 232 may be configured to compare the Caller ID information received from the phone app 234 with certain information stored in the user record 305 to determine or verify the identity of the calling user. The accessed user record 305 may comprise one or more consent values 330 that the user has previously provided, including for example a TCPA consent value 332 indicating whether the user has consented to receiving text messages from the business or other entity associated with the computer system 200.

At step 430, the consent manager 232 at the computer system 200 determines whether the calling user has provided consent to receive text messages. If the consent manager determines that the user has not provided such consent, then the sequence proceeds to step 480 where the computer system 200 does not send an autoreply response message to the user and the sequence ends at step 490. If, on the other hand, at step 430 the consent manager 232 determines that the calling user has provided consent to receive text messages, then the consent manager 232 may communicate with a message app 236 to indicate that an autoreply text message may be sent to the calling user. In some embodiments, the message app 236 may be separate from the phone app 234. In other embodiments, the exemplary phone and message apps 234 and 236 may be implemented as a single application in the computer system 200.

At step 440, the message app 236 automatically generates an autoreply message to send to the calling user, for example, in a text message to send to the user via SMS. In some embodiments, the phone app 234 or consent manager 232 may communicate information to the message app 236 for identifying the calling user. In such embodiments, the message app 236 may be configured to generate an autoreply message based on the identity of the user, for example, by looking up a predefined autoreply message for that user in a database (not shown in FIG. 2) stored in memory 230, nonvolatile memory 240, or in a remote database accessible through the communication interfaces 210. In some embodiments, the message app 236 may be configured to generate the same autoreply message for all calling users. In yet other embodiments, the message app 236 may be configured to dynamically generate an autoreply message, or at least a portion of the autoreply message, for the calling user.

In some embodiments, for example, the message app 236 may use the calling user's phone number, identified from the Caller ID information of the incoming call (at step 420) or from the accessed user record 305, to address the autoreply reply message. In some implementations, the message app 236 may be configured to include a dynamically-generated salutation based on the calling user's name identified from the Caller ID information or from the user's record 305. In yet other embodiments, if the message app 236 can determine any content of the incoming telephone call, such as using natural language processing (NLP) functionality accessible through a local NLP engine 238 or through a remote NLP cloud service, the message app 236 may dynamically generate at least some of the substance of the autoreply message based on the content of the received incoming call. In such embodiments, the NLP engine or cloud service may provide a transcription of at least a portion of the incoming call to the phone app 234 and/or the message app 236, which in turn may perform pattern matching or other processing to identify one or more words or phrases in the incoming user call. For instance, a machine learning or other artificial intelligence engine 238 may be resident in the memory 230 of the computer system 200, or may be accessible to the computer system 200 via a cloud service through the communication interfaces 210, for processing and analyzing the contents of incoming calls.

At step 450, the message app 236 in the computer system 200 may determine whether any additional user consents are required before sending the autoreply message to the calling user. For example, if the autoreply message contains any advertising, marketing, ePHI, or billing information, the message app 236 may coordinate with the consent manager 232 to determine whether the user has provided the additional user consent(s) needed before sending the autoreply message. For example, in some embodiments, the consent manager 232 may determine if an additional user consent is required at step 450 based on information it receives from the message app 236. In alternative embodiments, the message app 236 may make the determination at step 450 and request that the consent manager 232 confirm that the user has provided the corresponding user consent 330.

If, at step 450, it is determined that an additional user consent is required to send the autoreply message, then at step 460 the consent manager 232 may be configured to check whether the user record 305 for the calling user indicates that the user has provided the additional consent. If so, the process returns to step 450 to determine if another user consent may be needed to send the autoreply. At step 460, if the user record 305 indicates that the calling user has not provided the additional necessary consent, then at step 480 the computer system 200 does not send the autoreply message. In this case, the message app 236 may be configured to discard or otherwise delete the autoreply message from the memory 230. The sequence ends at step 490.

If all additional user consents have been verified at steps 450-460, the sequence proceeds from step 450 to step 470 where the computer system 200 sends the autoreply message to the calling user over an appropriate communication interface 210. Then, the sequence ends at step 490. Advantageously, as described above, the computer system 200 may be configured to not only automatically generate and send an autoreply message in response to receiving an incoming call from a remote user, but also can be configured to automatically verify that all necessary user consents have been obtained from the user before the autoreply message may be sent. In this manner, the computer system 200 can integrate an automated consent management system with its generation of autoreply messages, thereby ensuring the transmission of the autoreply message to a calling user is in compliance with laws, rules, and regulations requiring user consents.

Figure 5:
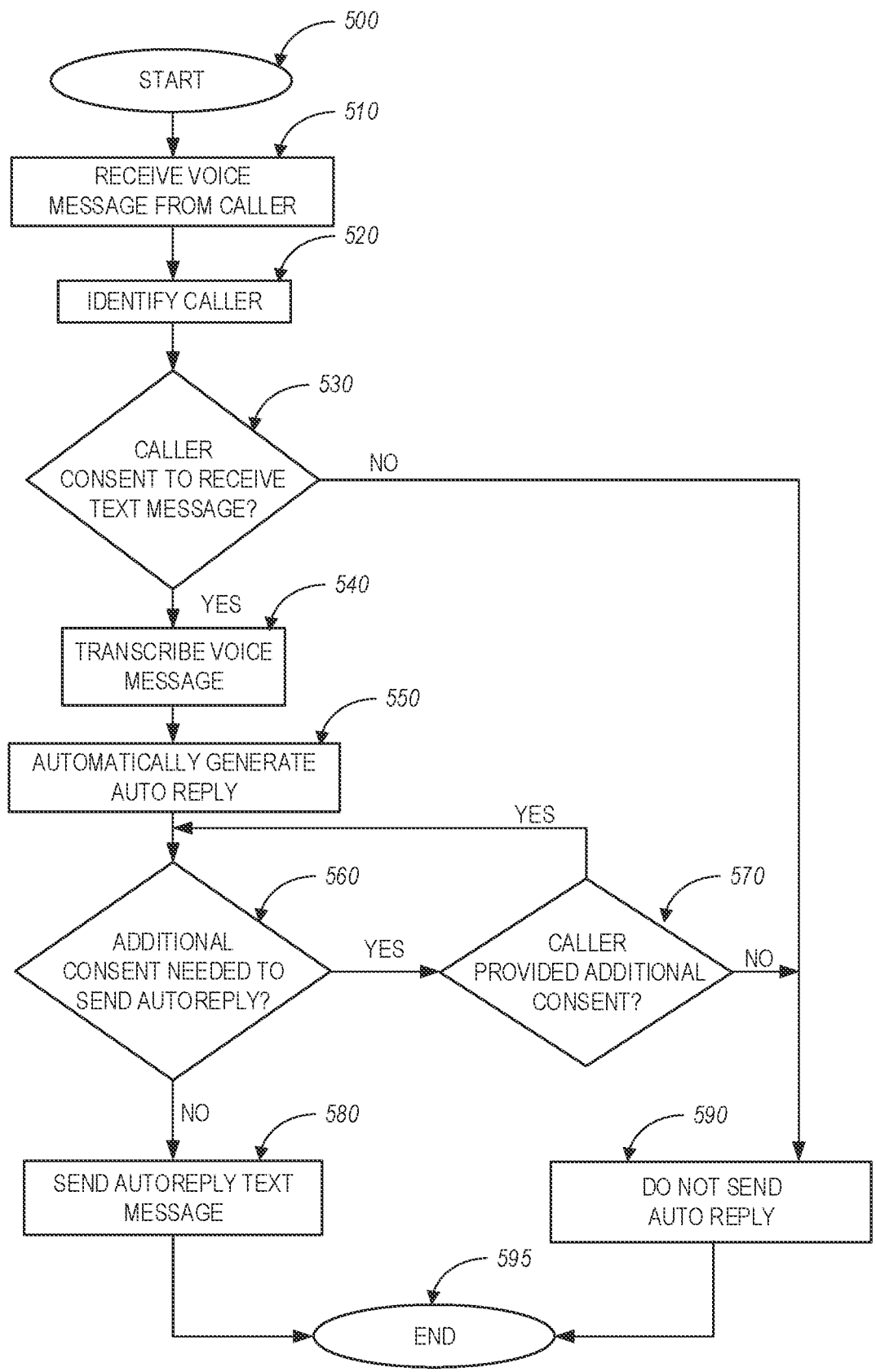
FIG. 5 is a schematic diagram illustrating another exemplary sequence of steps that may be performed by the server of FIG. 2 in accordance with certain disclosed embodiments.

FIG. 5 is a flowchart illustrating an exemplary sequence of steps that may be performed at the computer system 200 to automatically generate an autoreply message in response to a received voice message from a remote user in accordance with certain disclosed embodiments. In some embodiments, the computer system 200 may be implemented as one or more servers at a health care provider, such as a doctor office, and the calling user may be a patient. Those skilled in the art will also appreciate the computer system used in accordance with the exemplary steps of FIG. 5 may be comprise one or more computers at any business or other entity configured to communicate with remote users.

The sequence in FIG. 5 starts at step 500 and advances to step 510 where the computer system 200 receives a voice message from the user. For example, the computer system 200 may include a cellular network interface 210 configured to receive an incoming call, and the call may be processed by a phone app 234 executing on the computer system. The phone app 234 may be configured to prompt the user to leave a message, and may be further configured to record the user's voice message as an audio file in the memory 230. Alternatively, the phone app 234 may be configured to obtain the user's voice message from a telecommunication carrier that provides telephony services to the business or other entity associated with the computer system 200. In such embodiments, the phone app 234 may be configured to retrieve the user's recorded voice message from a voice mailbox stored by the telecommunication carrier.

At step 520, the computer system 200 may be configured to identify Caller ID information and/or other metadata associated with the voice message from the user. For example, in some embodiments, a computer file containing the user's voice message may contain certain Caller ID information, such as stored in a file header or at one or more predetermined locations in the file, file name, or file path, identifying a phone number and/or a name or other personal identifier of the user that left the voice message. In embodiments in which the voice message is stored by the telecommunication carrier, the Caller ID information associated with the user's recorded voice message may be downloaded separately or together with the voice message.

In some embodiments, the phone app 234 is configured to identify such Caller ID information and provide the Caller ID information to the consent manager 232 on the computer system 200. The consent manager 232 may be configured to use at least a portion of the Caller ID information to access a user record 305 associated with the user that left the voice message. The accessed user record 305 may be stored with user-consent data 300 in a memory 230, a nonvolatile memory 240, or in one or more remote databases (not shown in FIG. 2) that may be accessible to the computer system 200 through the communication interfaces 210.

In some embodiments, the consent manager 232 may be configured to compare the Caller ID information received from the phone app 234 with certain information stored in the user record 305 to verify the identity of the user that left the voice message. The accessed user record 305 may comprise one or more consent values 330 that the user has previously provided, including for example a TCPA consent value 332 indicating whether the user has consented to receiving text messages from the business or other entity associated with computer system 200.

At step 530, the consent manager 232 at the computer system 200 determines whether the user that left the voice message has provided consent to receive text messages. If the consent manager determines that the user has not provided such consent, then the sequence proceeds to step 590 where the computer system 200 does not send an autoreply response message to the user and the sequence ends at step 595. If, on the other hand, at step 530 the consent manager 232 determines that the user has provided consent to receive text messages, then the consent manager 232 may communicate with a message app 236 to indicate that an autoreply text message may be sent to the user that left the voice message. In some embodiments, the message app 236 may be separate from the phone app 234. In other embodiments, the phone and message apps 234 and 236 may be implemented as a single application in the computer system 200.

At step 540, the phone app 234, message app 236, or another application 238 may be configured to transcribe the voice message, preferably as a transliteration of the user's voice recording into a desired language such as English. For example, in some embodiments, the phone app 234 or message app 236 may employ NLP functionality accessible through a local NLP engine 238 or through a remote NLP cloud service. In such embodiments, the local or remote NLP engine may provide a transcription of at least a portion of the user's voice message to the phone app 234 and/or the message app 236. Alternatively, the NLP functionality may be directly integrated into either of the phone app or message app.

Next, at step 550, the message app 236 automatically generates an autoreply message to send to the user that left the voice message, for example, in a text message to send to the user via SMS. In some embodiments, the phone app 234 or consent manager 232 may communicate information to the message app 236 for identifying the user. In such embodiments, the message app 236 may be configured to generate an autoreply message based on the identity of the user, for example, by looking up a predefined autoreply message for that user in a database (not shown in FIG. 2) stored in memory 230, nonvolatile memory 240, or in a remote database accessible through the communication interfaces 210. In some embodiments, the message app 236 may be configured to generate the same autoreply message for all users. In yet other embodiments, the message app 236 may be configured to dynamically generate an autoreply message, or at least a portion of the autoreply message, based on the contents of the received voice message and/or any Caller ID information or metadata associated with the voice message.

In some embodiments, for example, the message app 236 may use the user's phone number, identified from the Caller ID information or other metadata associated with the received voice message (at step 520) or from the accessed user record 305, to address the autoreply reply message. In some implementations, the message app 236 may be configured to include a dynamically-generated salutation based on the calling user's name identified from the Caller ID information or other metadata associated with the voice message or from the user's record 305. In yet other embodiments, the message app 236 may dynamically generate at least some of the substance of the autoreply message based on the transcribed content of the voice message obtained at step 540. In such embodiments, a local or remote NLP engine may provide a transcription of at least a portion of the voice message to the phone app 234 and/or the message app 236, which in turn may perform pattern matching or other processing to identify one or more words or phrases in the user's voice message. For instance, a machine learning or other artificial intelligence engine 238 may be resident in the memory 230 of the computer system 200, or may be accessible to the computer system 200 via a cloud service through the communication interfaces 210, for processing and analyzing the contents of the transcribed voice message.

At step 560, the message app 236 in the computer system 200 may determine whether any additional user consents are required before sending the autoreply message to the user that left the voice message. For example, if the autoreply message contains any advertising, marketing, ePHI, or billing information, the message app 236 may coordinate with the consent manager 232 to determine whether the user has provided the additional user consent(s) needed before sending the autoreply message. For example, the consent manager 232 may determine if an additional user consent is required at step 560 based on information it receives from the message app 236. In other embodiments, the message app 236 may make the determination at step 560 and request that the consent manager 232 confirm the user has provided the corresponding user consent 330.

If, at step 560, it is determined that an additional user consent is required to send the autoreply message, then at step 570 the consent manager 232 may be configured to check whether the user record 305 for the user that left the voice message indicates that the user has provided the additional consent. If so, the process returns to step 560 to determine if another user consent may be needed to send the autoreply. At step 570, if the user record 305 indicates that the user has not provided the additional necessary consent, then at step 590 the computer system 200 does not send the autoreply message. In this case, the message app 236 may be configured to discard or otherwise delete the autoreply message from the memory 230. The sequence ends at step 595.

If all additional user consents have been verified at steps 560-570, the sequence proceeds from step 560 to step 580 where the computer system 200 sends the autoreply message to the user that left the voice message over an appropriate communication interface 210. Then, the sequence ends at step 595. Like the embodiment described with reference to FIG. 4, in this alternative embodiment of FIG. 5 the computer system 200 may be configured to not only automatically generate and send an autoreply message in response to receiving an incoming call from a remote user, but also can be configured to automatically verify that all necessary user consents have been obtained from the user before the autoreply message may be sent. In this manner, the computer system 200 can integrate an automated consent management system with its generation of autoreply messages, thereby ensuring the transmission of the autoreply message to a calling user is in compliance with laws, rules, and regulations requiring user consents.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions that may be executed on a computer, hardware, firmware, or a combination thereof. It also will be apparent to those skilled in the art that other processor and memory types, including various computer-readable media, may be used to store and execute program instructions pertaining to the techniques described herein. Further, the invention is not limited to any particular hardware platform or set of software capabilities.

While the disclosed embodiments illustrate various processes, it is expressly contemplated that various processes may be embodied as modules configured to operate in accordance with the techniques herein (e.g., according to the functionality of a similar process). Further, while certain processes have been shown or described separately, those skilled in the art will appreciate that the disclosed processes may be routines or modules within other processes.

In addition, it is expressly contemplated that the exemplary sequence of steps described with reference to FIGS. 4 and 5 may be performed in different orders than the exemplary order shown in these figures. By way of example and not limitation, in some embodiments the steps of automatically generating the autoreply message (steps 440 and 550) may be performed after all necessary user consents have been verified (steps 430, 450-460 and 530, 560-570). In such alternative embodiments, for example, the types of user consents that are necessary to send the autoreply message may be known ahead of time by the consent manager 232, message app 236, or any other application, e.g., to enable the consent manager 232 to check all necessary user consents prior to generation of the autoreply message by the message app 236.

Accordingly, this description is to be taken only by way of example and not to otherwise limit the scope of the embodiments herein. Therefore, it is the object of the appended claims to cover all such variations and modifications as come within the true spirit and scope of the embodiments herein.

We claim:

1. A method for integrating an automated consent management system with automatic generation and transmission of autoreply messages at a computer system, the computer system having one or more communication interfaces for communicating with one or more users over first and second communication channels, the method comprising:
  receiving, at the one or more communication interfaces, an incoming communication from a user over the first communication channel;
  identifying the user based on information received with the incoming communication;
  using the automated consent management system to determine whether the identified user has provided a consent to receive messages from the computer system over the second communication channel;
  using the automated consent management system to determine whether the identified user has provided an additional consent required to receive messages from the computer system over the second communication channel; and
  transmitting, through the one or more communication interfaces, an autoreply message to the user over the second communication channel if the automated consent management system has determined that the identified user has provided both the consent and the additional consent for receiving messages from the computer system over the second communication channel.

2. The method of claim 1, wherein the incoming communication is a telephone call and the autoreply message is transmitted to the user in a text message.

3. The method of claim 2, wherein the first communication channel corresponds to a voice-call connection from the user to the computer system, and the second communication channel corresponds to a text-message connection from the computer system to the user.

4. The method of claim 2, wherein the one or more communication interfaces include a cellular network interface configured to receive the telephone call from the user and to also transmit the autoreply message to the user in a text message.

5. The method of claim 1, wherein the consent indicates that the user has consented to receiving text messages from the computer system.

6. The method of claim 5, wherein the consent indicates that the user has provided consent to receive text messages pursuant to the Telephone Consumer Protection Act (TCPA).

7. The method of claim 1, wherein the additional consent indicates that the user has provided consent for the computer system to communicate the user's health information.

8. The method of claim 1, wherein the incoming communication comprises a voice message from the user and the autoreply message is transmitted to the user in a text message.

9. The method of claim 8, further comprising:
  transcribing the voice message from the user; and
  automatically generating the autoreply message to send to the user based on at least a portion of the contents of the transcribed voice message from the user.

10. The method of claim 1, wherein the computer system is implemented at a health care provider.

11. The method of claim 1, wherein the computer system is configured to transmit the same autoreply message to each of the one or more users.

12. A computer system configured to integrate an automated consent management system with automatic generation and transmission of autoreply messages, the computer system comprising:
  one or more communication interfaces configured to communicate with a user over first and second communication channels, wherein the one or more communication interfaces are configured to receive an incoming communication from the user over the first communication channel;

one or more processors;

a memory configured to store one or more user records and further configured to store computer-executable instructions, that when executed by the one or more processors, implement a consent manager, a phone application, and a message application, wherein execution of the computer-executable instructions further configure the computer system to:

identify, by the phone application, information corresponding to the user's identity based on information received with the incoming communication at the one or more communication interfaces;

provide, by the phone application, the information corresponding to the user's identity to the consent manager;

access, by the consent manager, a user record from the one or more user records based on the information corresponding to the user's identity provided by the phone application;

determine, by the consent manager, whether the accessed user record indicates that the user has provided a consent to receive messages from the computer system over the second communication channel;

determine, by the consent manager, whether the accessed user record indicates that the user has provided an additional consent to receive messages from the computer system over the second communication channel; and automatically generate, by the message application, an autoreply message to send to the user in response to the consent manager determining that the user has provided the consent and the additional consent to receive messages from the computer system over the second communication channel; and transmit, through the one or more communication interfaces, the generated autoreply message to the user over the second communication channel if the automated consent management system has determined that the user has provided both the consent and the additional consent for receiving messages from the computer system over the second communication channel.

13. The computer system of claim 12, wherein the incoming communication is a telephone call and the autoreply message is transmitted to the user in a text message.

14. The computer system of claim 13, wherein the first communication channel corresponds to a voice-call connection from the user to the computer system, and the second communication channel corresponds to a text-message connection from the computer system to the user.

15. The computer system of claim 13, wherein the one or more communication interfaces include a cellular network interface configured to receive the telephone call from the user and to also transmit the autoreply message to the user in a text message.

16. The computer system of claim 12, wherein the consent indicates that the user has consented to receiving text messages from the computer system.

17. The computer system of claim 12, wherein the additional consent indicates that the user has provided consent for the computer system to communicate the user's health information.

18. The computer system of claim 12, wherein the incoming communication comprises a voice message from the user and the autoreply message is transmitted to the user in a text message.

19. A non-transitory computer-readable medium comprising a set of computer-executable instructions that, when executed by one or more processors of a computer system, cause the computer system to integrate an automated consent management system with automatic generation and transmission of autoreply messages, the computer system having one or more communication interfaces for communicating with one or more users over first and second communication channels, wherein execution of the computer-executable instructions configure the computer system to:

receive, at the one or more communication interfaces, an incoming communication from a user over the first communication channel;

identify the user based on information received with the incoming communication;

use the automated consent management system to determine whether the identified user has provided a consent to receive messages from the computer system over the second communication channel;

use the automated consent management system to determine whether the identified user has provided an additional consent required to receive messages from the computer system over the second communication channel; and transmit, through the one or more communication interfaces, an autoreply message to the user over the second communication channel if the automated consent management system has determined that the identified user has provided both the consent and the additional consent for receiving messages from the computer system over the second communication channel.

20. The computer-readable medium of claim 19, wherein the incoming communication is a telephone call and the autoreply message is a text message.

* * * * *